US010370085B2

(12) United States Patent
Dorsett

(10) Patent No.: US 10,370,085 B2
(45) Date of Patent: Aug. 6, 2019

(54) BODY TAB YAW DEFLECTOR

(71) Applicant: Lockheed Martin Corporation, Bethesda, MD (US)

(72) Inventor: Kenneth Merle Dorsett, Aledo, TX (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 15/479,654

(22) Filed: Apr. 5, 2017

(65) Prior Publication Data
US 2017/0341730 A1  Nov. 30, 2017

Related U.S. Application Data

(63) Continuation-in-part of application No. 15/166,369, filed on May 27, 2016.

(51) Int. Cl.
*B64C 9/32* (2006.01)
*B64C 9/34* (2006.01)
(Continued)

(52) U.S. Cl.
CPC .......... *B64C 9/02* (2013.01); *B64C 3/10* (2013.01); *B64C 5/08* (2013.01); *B64C 5/10* (2013.01);
(Continued)

(58) Field of Classification Search
CPC .......... B64C 9/32; B64C 9/323; B64C 9/326; B64C 9/34; B64C 9/36; B64C 3/58;
(Continued)

(56) References Cited

U.S. PATENT DOCUMENTS 1,280,195 A  10/1918  Eaton
1,545,808 A   7/1925  Ajello
(Continued)

FOREIGN PATENT DOCUMENTS

DE  708447  7/1941
DE  718322  3/1942
(Continued)

OTHER PUBLICATIONS

Collins English Dictionary, "Definition of 'hinge'" 2010. Webster's New World College Dictionary, 4th Edition. Houghton Mifflin Harcourt. (Year: 2010).*
(Continued)

*Primary Examiner* — Richard R. Green
(74) *Attorney, Agent, or Firm* — Baker Botts LLP

(57) ABSTRACT

In one embodiment, an apparatus includes a first deflector configured to couple to a shaft of an aircraft. The first deflector may form part of a top surface of the aircraft when in a first closed position. The apparatus may further include a second deflector configured to couple to the shaft and form part of a bottom surface of the aircraft when in a second closed position. The first deflector and the second deflector may be configured to be positioned at a junction of a body of the aircraft and a wing of the aircraft. The first deflector and the second deflector may be configured to simultaneously pivot from the closed positions to respective first and second open positions upon actuation of the shaft.

20 Claims, 6 Drawing Sheets

(51) Int. Cl.
  *B64C 9/02* (2006.01)
  *B64C 3/10* (2006.01)
  *B64C 5/08* (2006.01)
  *B64C 5/10* (2006.01)
  *B64C 9/12* (2006.01)

(52) U.S. Cl.
  CPC ............... *B64C 9/12* (2013.01); *B64C 9/323* (2013.01); *B64C 9/326* (2013.01); *B64C 9/34* (2013.01); *Y02T 50/32* (2013.01); *Y02T 50/44* (2013.01)

(58) Field of Classification Search
  CPC ..... B64C 23/06; B64C 23/065; B64C 23/069; B64C 23/072; B64C 23/076
  See application file for complete search history.

(56) References Cited

U.S. PATENT DOCUMENTS

| | | | |
|---|---|---|---|
| 1,724,456 A | 8/1929 | Crook | |
| 2,003,223 A | 5/1935 | Rose | |
| 2,373,088 A | 4/1945 | Allen | |
| 2,373,089 A | 4/1945 | Allen et al. | |
| 2,433,649 A | 12/1947 | Clevenger et al. | |
| 2,557,829 A | 6/1951 | Lavelle | |
| 2,723,091 A * | 11/1955 | Davies | B64C 9/323 244/113 |
| 2,852,211 A | 9/1958 | X'enakis | |
| 2,987,277 A | 6/1961 | Richardson et al. | |
| 3,107,882 A | 10/1963 | Matteson et al. | |
| 3,721,406 A | 3/1973 | Hurlbert | |
| 3,774,869 A | 11/1973 | Harmon | |
| 4,003,533 A * | 1/1977 | Carter | B64C 9/326 244/217 |
| 4,132,375 A | 1/1979 | Lamar | |
| 4,391,424 A | 7/1983 | Bartoe, Jr. | |
| 4,466,586 A | 8/1984 | Burnham | |
| 4,566,657 A | 1/1986 | Grow | |
| 4,739,957 A * | 4/1988 | Vess | B64C 9/34 244/199.1 |
| 5,895,015 A | 4/1999 | Saiz | |
| 6,491,261 B1 | 12/2002 | Blake | |
| 7,780,120 B1 | 8/2010 | Fairchild | |
| 8,231,079 B2 * | 7/2012 | Oyama | B64C 9/326 244/110 A |
| 2007/0284483 A1 | 12/2007 | Milliere | |
| 2016/0001878 A1 | 1/2016 | Lee | |
| 2016/0137290 A1 * | 5/2016 | Emerick | B64C 21/02 244/36 |

FOREIGN PATENT DOCUMENTS

| | | | |
|---|---|---|---|
| DE | 726413 | 10/1942 | |
| DE | 737178 | 7/1943 | |
| GB | 919793 | 2/1963 | |
| GB | 1605235 A * | 6/1985 | ............ B64C 9/326 |
| GB | 2237254 | 5/1991 | |

OTHER PUBLICATIONS

Extended European Search Report; re: Appl. No. 17172520.3-1754; Reference JL89290P.EPP; 11 pages, dated Oct. 13, 2017.

* cited by examiner

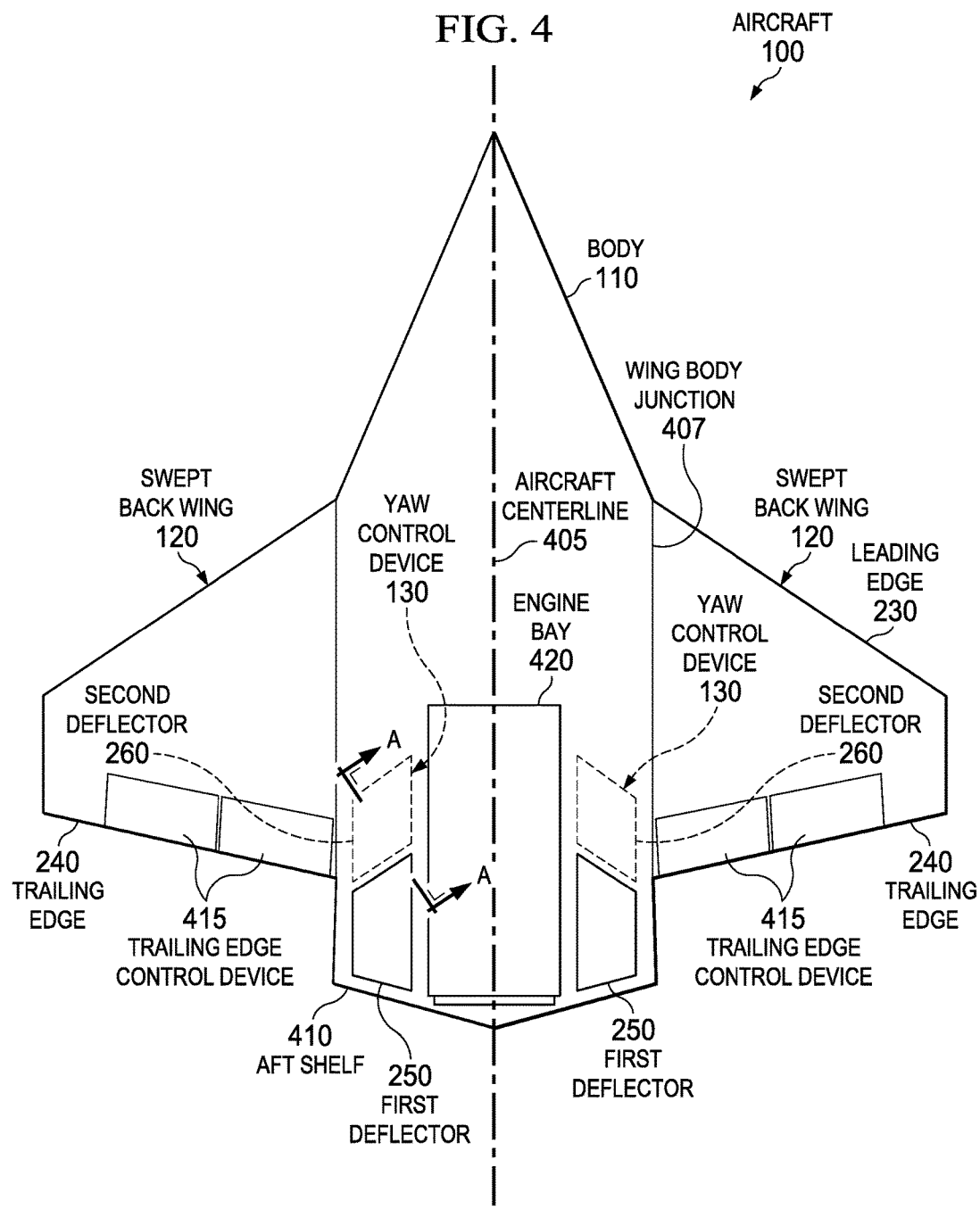

BODY TAB YAW DEFLECTOR

RELATED APPLICATIONS

This application is a continuation-in-part of prior U.S. application Ser. No. 15/166,369, filed May 27, 2016, entitled "Yaw Control In An Aircraft," which is hereby incorporated by reference.

TECHNICAL FIELD

This disclosure relates in general to aircraft control, and more particularly to yaw control in an aircraft.

BACKGROUND

During flight, a yawing moment may be exerted on an aircraft. The moment may cause a side-to-side movement of the aircraft's nose. This side-to-side movement may be referred to as yaw.

SUMMARY OF THE DISCLOSURE

According to one embodiment, an apparatus includes a first deflector configured to couple to a shaft of a wing of an aircraft and form part of a top surface of the wing when in a first closed position, and a second deflector configured to couple to the shaft and form part of a bottom surface of the wing when in a second closed position. The first deflector and the second deflector may be configured to be positioned proximate to the tip of the wing. The first deflector and the second deflector may be configured to simultaneously pivot from the closed positions to respective first and second open positions upon actuation of the shaft.

According to another embodiment, an apparatus includes a first deflector configured to couple to a shaft of an aircraft. The first deflector may form part of a top surface of the aircraft when in a first closed position. The apparatus may further include a second deflector configured to couple to the shaft and form part of a bottom surface of the aircraft when in a second closed position. The first deflector and the second deflector may be configured to be positioned at a junction of a body of the aircraft and a wing of the aircraft. The first deflector and the second deflector may be configured to simultaneously pivot from the closed positions to respective first and second open positions upon actuation of the shaft.

The present disclosure may provide numerous advantages. For example, the yaw control device may be positioned proximate to the wingtip such that thicker regions of the wing may be used for fuel storage thereby maximizing the range of an aircraft. As another example, positioning the yaw control device proximate to the wingtip so that the yaw control device is not in front of a trailing edge control device (e.g., an elevon) in the wing may provide a primary load path that may not have to transfer loads through multiple adjacent cutouts in the wing structure. As another example, a smaller actuator load may be used to actuate the deflectors of the yaw control device because the deflectors may be coupled to a common shaft. By coupling the deflectors to a common shaft, the aerodynamic moment about the shaft may be minimized due to opposing forces from the deflectors. Additionally, separate actuators may not be required since one actuator may be used to actuate the common shaft. As another example, the yaw control device may be positioned at a distance from the leading and trailing edges of a wing so that the leading and trailing edges are maintained as continuous edges with no breaks in the edges even when the yaw control device is in an open position, thereby enhancing the aerodynamic performance of the aircraft. As another example, the yaw control device may be positioned at a distance from the wingtip such that the tip of the wing may not open and close with the deflectors. This positioning may allow for continuous leading and trailing edges at the tip of the wing, which may allow for a stiffer wing structure. As another example, the common shaft may be oriented at an aft-swept angle, thereby providing a side force adding to the generation of a yaw moment. Deflectors having an aft-swept common shaft may generate a greater yaw moment for a given surface size than a common shaft oriented normal to a longitudinal axis of the aircraft. As another example, the deflectors of the yaw control device may each have an approximately equal area thereby providing counter-acting hinge moments about the common shaft attached to the deflectors. The counter-acting hinge moments may minimize the total hinge moment that the common control actuator must overcome, thereby allowing for a smaller actuator. As another example, the deflectors may be opened on both left and right wings simultaneously, thereby providing a speed-brake function. As another example, positioning the deflectors proximate to a junction where the wing and fuselage meet may allow an aircraft to use more area in the wing for fuel storage, thereby allowing the aircraft to travel longer distances. As another example, positioning the deflectors in the body (e.g., fuselage) of an aircraft proximate to a junction where the wing and the body meet may reduce the structural weight of the aircraft, because the deflectors may be positioned in an area that already has sufficient structural stiffness due to the region's depth. In that example, the aircraft may not need additional structural components that add weight, thereby potentially reducing the aircraft's structural weight. As another example, positioning the deflectors away from the trailing edge control devices may reduce adverse aerodynamic interactions that can result from integration of the deflectors with trailing edge control devices.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIG. 4 is a top view illustrating another example aircraft in which the example yaw control device may be used, according to certain embodiments;

DETAILED DESCRIPTION OF THE DISCLOSURE

Figure 1:
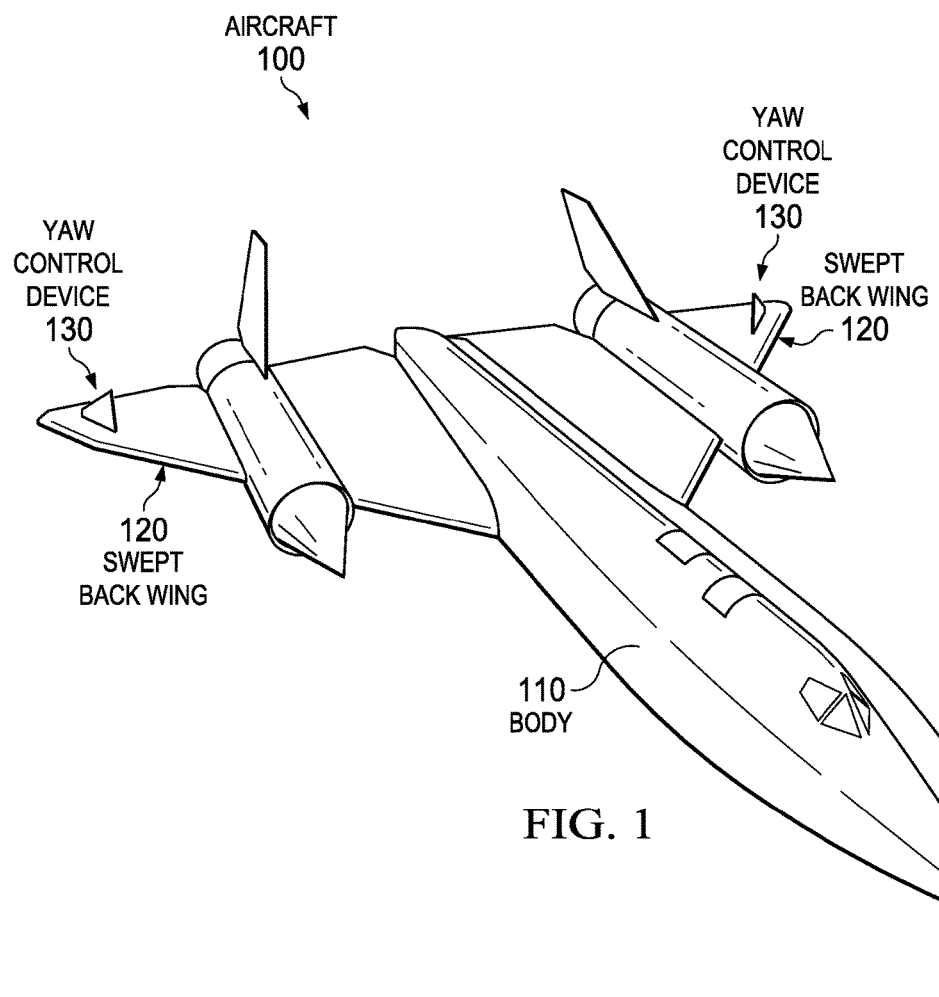
FIG. 1 is a diagram illustrating an aircraft in which an example yaw control device may be used, according to certain embodiments.

An aircraft may rotate about three axes due to forces exerted on the aircraft during flight. These three axes each intersect the aircraft's center of gravity and include the following: a pitch axis, a roll axis, and a yaw axis. The pitch axis is an axis that is perpendicular to the side of the body (e.g., a lateral axis through the aircraft's center of gravity). The roll axis is an axis that is parallel to the body (e.g., a longitudinal axis that runs the length of the body and intersects the aircraft's center of gravity). The yaw axis is an axis that is perpendicular to the top surface of the body (e.g., a vertical axis through the aircraft's center of gravity). An aircraft may include components to control rotation about these axes to provide stability and safety to the aircraft.

Yaw control may allow an aircraft to counteract side forces that are exerted on the aircraft during flight. For example, an aerodynamic force, such as wind, may act on a left side of an aircraft's nose. This aerodynamic force may create a moment about the aircraft's yaw axis that could result in the aircraft rotating clockwise about the yaw axis. Without yaw control to balance the aerodynamic force, the aircraft may rotate uncontrollably.

Accordingly, aspects of the present disclosure include an apparatus that, in one embodiment, includes a first deflector configured to couple to a shaft of a wing of an aircraft and form part of a top surface of the wing when in a first closed position, and a second deflector configured to couple to the shaft and form part of a bottom surface of the wing when in a second closed position. The first deflector and the second deflector may be configured to be positioned proximate to the tip of the wing. The first deflector and the second deflector may be configured to simultaneously pivot from the closed positions to respective first and second open positions upon actuation of the shaft.

The present disclosure may provide numerous advantages. For example, the yaw control device may be positioned proximate to the wingtip such that thicker regions of the wing may be used for fuel storage thereby maximizing the range of an aircraft. As another example, positioning the yaw control device proximate to the wingtip so that the yaw control device is not in front of a trailing edge control device (e.g., an elevon) in the wing may provide a primary load path that may not have to transfer loads through multiple adjacent cutouts in the wing structure. As another example, a smaller actuator load may be used to actuate the deflectors of the yaw control device because the deflectors may be coupled to a common shaft. By coupling the deflectors to a common shaft, the aerodynamic moment about the shaft may be minimized due to opposing forces from the deflectors. Additionally, separate actuators may not be required since one actuator may be used to actuate the common shaft. As another example, the yaw control device may be positioned at a distance from the leading and trailing edges of a wing so that the leading and trailing edges are maintained as continuous edges with no breaks in the edges even when the yaw control device is in an open position, thereby enhancing the aerodynamic performance of the aircraft. As another example, the yaw control device may be positioned at a distance from the wingtip such that the tip of the wing may not open and close with the deflectors. This positioning may allow for continuous leading and trailing edges at the tip of the wing, which may allow for a stiffer wing structure. As another example, the common shaft may be oriented at an aft-swept angle, thereby providing a side force adding to the generation of a yaw moment. Deflectors having an aft-swept common shaft may generate a greater yaw moment for a given surface size than a common shaft oriented normal to a longitudinal axis of the aircraft. As another example, the deflectors of the yaw control device may each have an approximately equal area thereby providing counter-acting hinge moments about the common shaft attached to the deflectors. The counter-acting hinge moments may minimize the total hinge moment that the common control actuator must overcome, thereby allowing for a smaller actuator. As another example, the deflectors may be opened on both left and right wings simultaneously, thereby providing a speed-brake function. Other technical advantages will be readily apparent to one skilled in the art from the following figures, descriptions, and claims. Moreover, while specific advantages have been enumerated above, various embodiments may include all, some, or none of the enumerated advantages.

Figure 2:
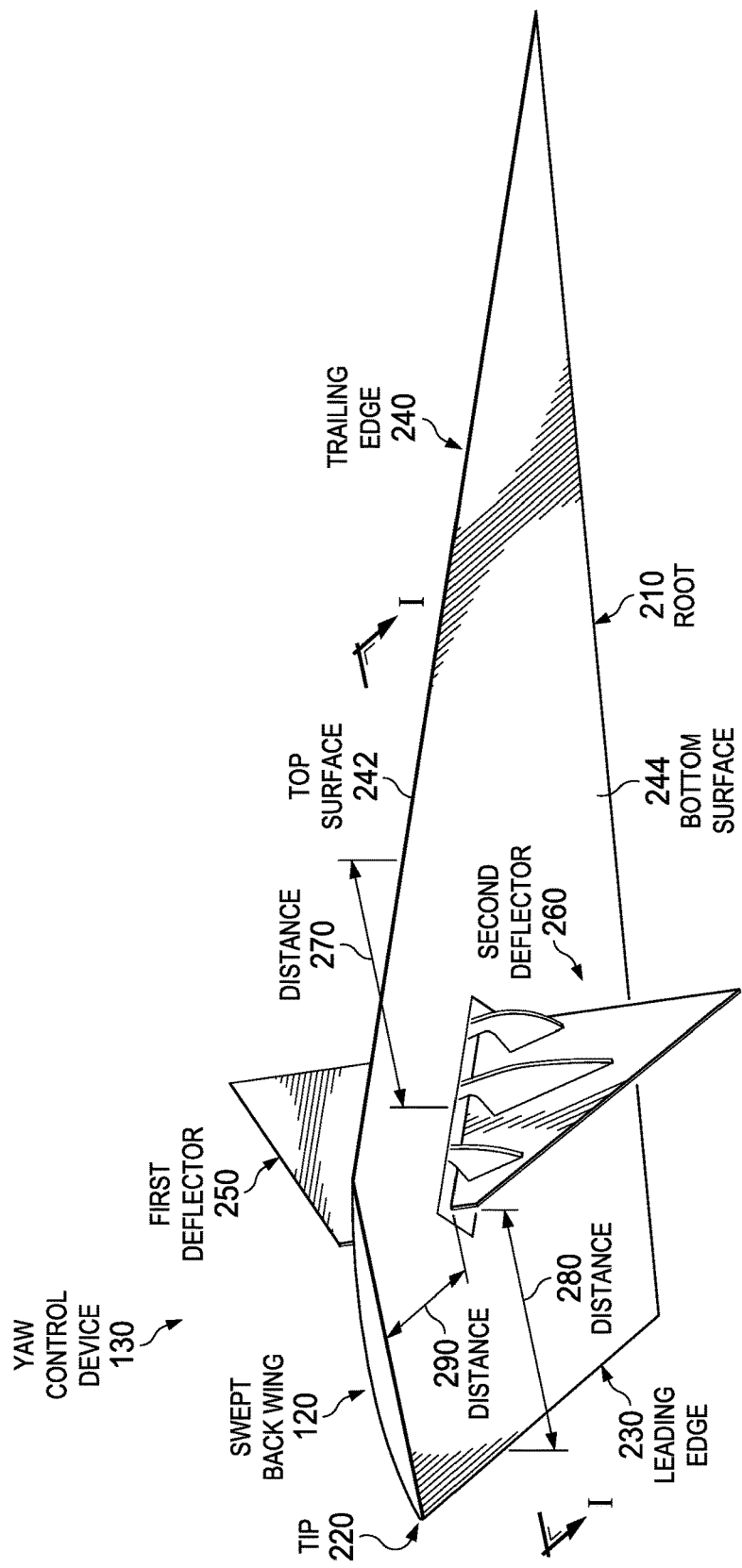
FIG. 2 is a bottom perspective view illustrating an example of a swept back wing with the yaw control device of FIG. 1, according to certain embodiments.
Figure 3A:
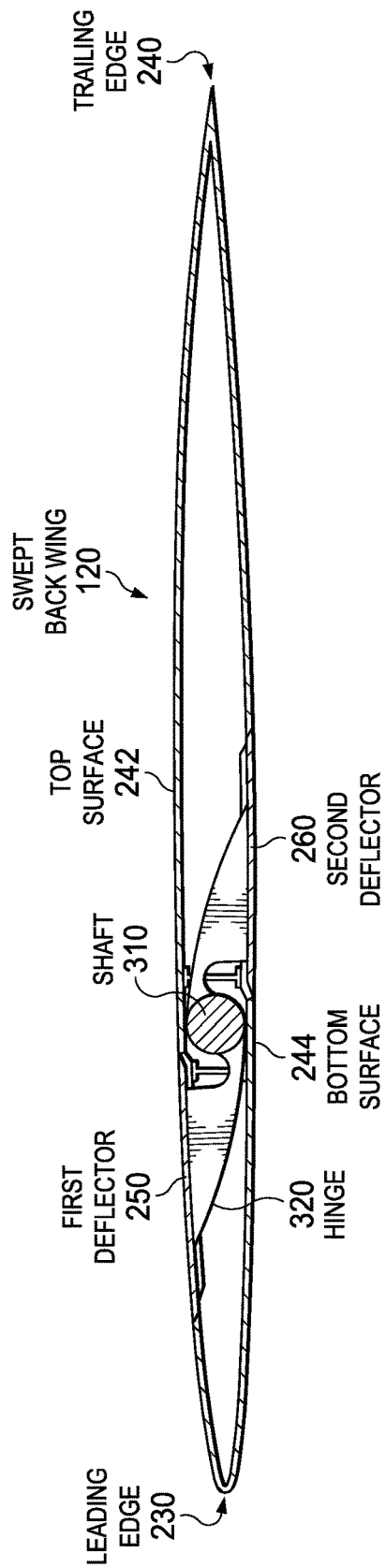
FIG. 3A is a section view illustrating an example of the swept back wing with the yaw control device of FIG. 2 in a closed position, according to certain embodiments.
Figure 3B:
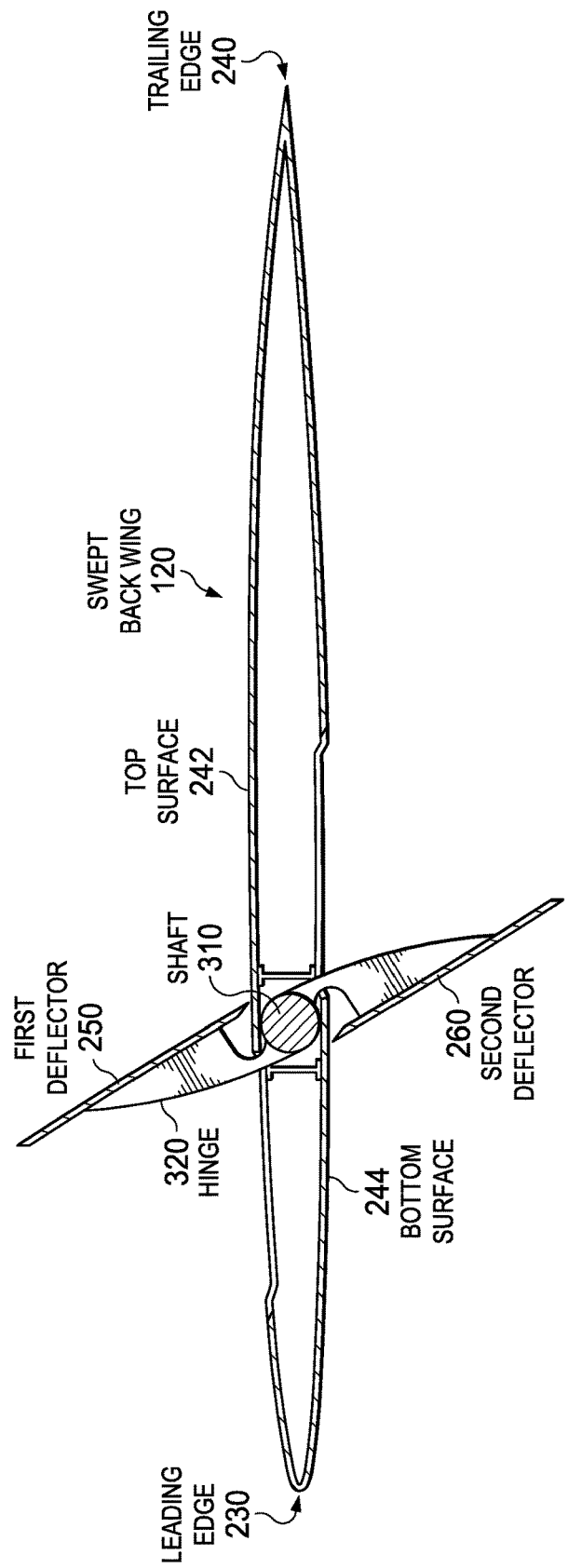
FIG. 3B is a section view illustrating an example of the swept back wing with the yaw control device of FIG. 2 in an open position, according to certain embodiments.

Additional details are discussed in FIGS. 1 through 3. FIG. 1 illustrates aircraft 100 in which an example yaw control device 130 may be used, and FIG. 2 shows an example swept back wing 120 with yaw control device 130 of FIG. 1. FIGS. 3A and 3B illustrate a section view of swept back wing 120 and yaw control device 130 of FIG. 2 in a closed and open position.

FIG. 1 is a diagram illustrating an aircraft 100 in which an example yaw control device 130 may be used, according to certain embodiments. Aircraft 100 may be any type of airborne vehicle in an embodiment. For example, aircraft 100 may be a tailless aircraft. Tailless aircraft may not have a vertical fin and/or a horizontal stabilizing structure in the aircraft's tail section in some embodiments. As another example, aircraft 100 may be an aircraft with a tail. Aircraft 100 may include a body 110, a swept back wing 120 and a yaw control device 130 in certain embodiments.

Body 110 may be a structural component of aircraft 100 in an embodiment. For example, body 110 may be a fuselage. As another example, body 110 may be the main structural component of an aircraft with a "flying wing" configuration. Body 110 may be any shape. For example, body 110 may be a long hollow cylindrical tube. As another example, body 110 may have a slender shape to reduce drag, such as in a fighter plane. Body 110 may be coupled to swept back wing 120 in certain embodiments.

Swept back wing 120 may be a wing that angles rearward from root 210 in an embodiment. For example, swept back wing 120 may be angled rearward in a direction from the nose of aircraft 100 towards the rear of aircraft 100 rather than at an angle perpendicular to body 110. Swept back wing 120 may have various sweep angles that can be measured by comparing a line from leading edge 230 to tip 220 to a perpendicular of a longitudinal axis of body 110 (such as the pitch axis). For example, swept back wing 120 may have a sweep angle of twenty-five degrees. As another example, swept back wing 120 may have a sweep angle of forty-five degrees. Swept back wing 120 may be coupled to body 110 at root 210 in certain embodiments. Swept back wing 120 may provide a technical advantage of delaying shockwaves and aerodynamic drag of aircraft 100. Swept back wing 120 may include a yaw control device 130 in certain embodiments. In some embodiments, the wing may have no sweep, or may be swept forward.

Yaw control device 130 may be a device that includes first deflector 250 and second deflector 260 (described below) configured to provide yaw control in aircraft 100 in certain embodiments. As noted above, aerodynamic forces may be exerted on aircraft 100, which may cause aircraft 100 to rotate about its yaw axis. To counteract these aerodynamic forces and balance aircraft 100, yaw control device 130 may be actuated such that yaw control device 130 pivots to an open position. One or more yaw control devices 130 may be positioned on each swept back wing 120. For example, each swept back wing 120 may have two yaw control devices 130. In that example, each yaw control device 130 may have two deflectors that are actuated by separate shafts. Yaw control device 130 may be positioned proximate to tip 220 of swept back wing 120 in certain embodiments.

FIG. 2 is a bottom perspective view illustrating an example of swept back wing 120 with yaw control device 130 of FIG. 1, according to certain embodiments. Swept back wing 120 may include a root 210, a tip 220, a leading edge 230, a trailing edge 240, a first deflector 250, a second deflector 260, and distances 270, 280, and 290 in certain embodiments.

Root 210 may be a portion of swept back wing 120 that is attached to body 110 in an embodiment. In some embodiments, root 210 may represent the centerline of aircraft 100, such as in a "flying wing" configuration. Root 210 may be located proximal to body 110 and distal to tip 220 in an embodiment. Root 210 may run parallel to body 110 in certain embodiments. Root 210 may be positioned opposite to tip 220 in certain embodiments.

Tip 220 of swept back wing 120 may be a portion of swept back wing 120 that forms the outermost edge of swept back wing 120 with respect to body 110. Tip 220 may be distal to body 110 in an embodiment. Tip 220 may be positioned opposite to root 210 in certain embodiments. Tip 220 may have a continuous edge in an embodiment. For example, when first deflector 250 and second deflector 260 are positioned in an open position, an edge of tip 220 may not have a break in its structure. In certain embodiments, tip 220 remains in a fixed position and does not actuate or pivot with first deflector 250 and second deflector 260. A continuous edge at tip 220 may provide improved structural stiffness and structural load paths. In addition, a continuous edge at tip 220 may provide improved aerodynamic efficiency due to the lack of gaps or edges in tip 220 associated with other tip-mounted control surfaces.

Leading edge 230 may be the foremost edge of swept back wing 120 in an embodiment. Leading edge 230 may be a continuous edge in certain embodiments. For example, when first deflector 250 and second deflector 260 are positioned in an open position, leading edge 230 may be a single edge without any breaks in its structure. In certain embodiments, leading edge 230 remains in a fixed position and does not actuate or pivot with first deflector 250 and second deflector 260. A continuous edge along leading edge 230 may provide improved aerodynamic efficiency due to the lack of gaps or edges in leading edge 230.

Trailing edge 240 may be the rear edge of swept back wing 120 in an embodiment. Trailing edge 240 may be opposed to leading edge 230 in an embodiment. Trailing edge 240 may be a continuous edge in certain embodiments. For example, when first deflector 250 and second deflector 260 are positioned in an open position, trailing edge 240 may be a single edge without any breaks in its structure. In certain embodiments, trailing edge 240 remains in a fixed position and does not actuate or pivot with first deflector 250 and second deflector 260. A continuous edge along trailing edge 240 may provide improved aerodynamic efficiency due to the lack of gaps or edges in trailing edge 240.

Top surface 242 may be a surface of swept back wing 120 that is the top-most surface of swept back wing 120 in an embodiment. Top surface 242 may also be a surface from which first deflector 250 extends when actuated to an open position. Top surface 242 may be opposed to bottom surface 244 in an embodiment.

Bottom surface 244 may be a surface of swept back wing 120 that is the bottom-most surface of swept beck wing 120 in an embodiment. Bottom surface 244 may also be a surface from which second deflector 260 extends when actuated to an open position in an embodiment. Bottom surface 244 may be opposed to top surface 242 in an embodiment.

First deflector 250 may be a panel of swept back wing 120 that provides yaw control for aircraft 100 in an embodiment. First deflector 250 may be located proximate to tip 220 in an embodiment. For example, first deflector 250 may be positioned at distance 290 from tip 220. In that example, first deflector 250 may be positioned closer to tip 220 than to root 210. First deflector 250 may be positioned at distance 290 from tip 220 such that tip 220 does not actuate with first deflector 250. First deflector 250 may be positioned distal to root 210 and body 110 in an embodiment. By positioning first deflector 250 proximate to tip 220, first deflector 250 may provide the ability for tip 220 to be a continuous closed structure that may have advantages of stiffness, lighter weight and improved aerodynamics. First deflector 250 may be attached to shaft 310 (discussed below in reference to FIG. 3A) in certain embodiments. For example, first deflector 250 may be attached to shaft 310 using hinge 320. First deflector 250 may be actuated by shaft 310 in an embodiment. For example, first deflector 250 may be actuated by pilot control or automatically. First deflector 250 may be approximately the same size as second deflector 260 in an embodiment. For example, first deflector 250 and second deflector 260 may have the same length and width. As another example, first deflector 250 and second deflector 260 may have the same area. The surface area of first deflector 250 may be adjusted as needed to provide the best balance between control authority and minimizing actuator hinge moment. First deflector 250 may be any shape in an embodiment. First deflector 250 may be made of any material, such as a metal or a composite. First deflector 250 may form part of top surface 242 when positioned in a closed position. First deflector 250 may pivot upward from top surface 242 when shaft 310 is actuated. By pivoting upward from top surface 242, first deflector 250 may provide yaw control to aircraft 100 when pivoted on a single side of aircraft 100. First deflector 250 may be configured to pivot to an open position such that first deflector 250 has an angle of incidence to an airflow. This configuration may be done by, for example, coupling first deflector 250 to a shaft (e.g., shaft 310) that has a swept back angle. When first deflector 250 is pivoted on both sides of aircraft 100, first deflector 250 may act as an air brake.

Second deflector 260 may be a panel of swept back wing 120 that provides yaw control for aircraft 100 in an embodiment. Second deflector 260 may be located proximate to tip 220 in an embodiment. For example, second deflector 260 may be positioned at distance 290 from tip 220. In that example, second deflector 260 may be positioned closer to tip 220 than to root 210. Second deflector 260 may be positioned at distance 290 from tip 220 such that tip 220 does not actuate with second deflector 260. Second deflector 260 may be positioned distal to root 210 and body 110 in an embodiment. By positioning second deflector 260 proximate to tip 220, second deflector 260 may provide the ability for tip 220 to be a continuous closed structure that may have advantages of stiffness, lighter weight, and improved aerodynamics. Second deflector 260 may be attached to shaft 310 in certain embodiments. For example, second deflector 260 may be attached to shaft 310 using hinge 320. Second deflector 260 may be actuated by shaft 310 in an embodiment. For example, second deflector 260 may be actuated by pilot control or automatically. Second deflector 260 may be approximately the same size as first deflector 250 in an embodiment. For example, first deflector 250 and second deflector 260 may have the same length and width. As another example, first deflector 250 and second deflector 260 may have the same area. The surface area of second deflector 260 may be adjusted as needed to provide the best balance between control authority and minimizing actuator hinge moment. Second deflector 260 may be any shape in an embodiment. Second deflector 260 may be made of any material, such as a metal or a composite. Second deflector 260 may form part of bottom surface 244 when positioned in a closed position. Second deflector 260 may pivot downward from bottom surface 244 when shaft 310 is actuated. By pivoting downward from bottom surface 244, second deflector 260 may provide yaw control to aircraft 100 when pivoted on a single side of aircraft 100. Second deflector 260 may be configured to pivot to an open position such that second deflector 260 has an angle of incidence to an airflow. This configuration may be done by, for example, coupling second deflector 260 to a shaft (e.g., shaft 310) that has a swept back angle. When second deflector 260 is pivoted on both sides of aircraft 100, second deflector 260 may act as an air brake.

Distance 270 may be a non-zero distance from trailing edge 240 to first deflector 250 and second deflector 260 in an embodiment. Distance 270 may allow trailing edge 240 to be maintained as a continuous edge when first deflector 250 and second deflector 260 are positioned in an open position.

Distance 280 may be a non-zero distance from leading edge 230 to first deflector 250 and second deflector 260 in an embodiment. Distance 280 may allow leading edge 230 to be maintained as a continuous edge when first deflector 250 and second deflector 260 are positioned in an open position.

Distance 290 is a non-zero distance from tip 220 to first deflector 250 and second deflector 260 in an embodiment. Distance 290 may allow tip 220 to be maintained as a continuous edge even when first deflector 250 and second deflector 260 are positioned in an open position. Distance 290 may be a distance such that first deflector 250 and second deflector 260 are positioned proximate to tip 220 and distal to root 210.

FIG. 3A is a section view illustrating an example of swept back wing 120 with yaw control device 130 of FIG. 2 in a closed position, according to certain embodiments. FIG. 3B is a section view illustrating an example of swept back wing 120 with yaw control device 130 of FIG. 2 in an open position, according to certain embodiments. These figures will be discussed together below. Generally, in operation, yaw control device 130 may be actuated from a closed position, as illustrated in FIG. 3A, to an open position, as illustrated in FIG. 3B, to provide yaw control to aircraft 100.

As shown in the section view taken along section I-I of FIG. 2, swept back wing 120 may include a shaft 310 and a hinge 320 in an embodiment.

Shaft 310 may be any type of shaft configured to couple to first deflector 250 and second deflector 260 in certain embodiments. Shaft 310 may couple to first deflector 250 and second deflector 260 in any manner. For example, shaft 310 may couple to first deflector 250 and second deflector 260 using hinge 320. Shaft 310 may be positioned at a swept back angle in certain embodiments. For example, shaft 310 may be positioned at a swept back angle parallel to swept back wing 120. Positioning shaft 310 at a swept back angle may allow shaft 310 to actuate first deflector 250 and second deflector 260 such that those deflectors have an angle of incidence to an airflow. Shaft 310 may be positioned proximate to leading edge 230 in certain embodiments. Shaft 310 may be positioned distal to trailing edge 240 in certain embodiments. Shaft 310 may be configured to simultaneously actuate first deflector 250 and second deflector 260 in an embodiment.

Hinge 320 may be any type of hinge configured to couple first deflector 250 and second deflector 260 to shaft 310 in an embodiment. For example, hinge 320 may be a gooseneck hinge. As another example, hinge 320 may be a gooseneck hinge connected to push rod linkages. As another example, hinge 320 may be arranged in a butterfly valve style of arrangement.

As an example embodiment of operation, one embodiment may include aircraft 100 with body 110 and swept back wing 120. Swept back wing 120 may include yaw control device 130 with first deflector 250 and second deflector 260 each coupled to shaft 310 and positioned proximate to tip 220 of swept back wing 120. First deflector 250 and second deflector 260 may initially be in a closed position, as illustrated in FIG. 3A. As aerodynamic forces act upon a side of aircraft 100, the forces may cause a moment about the yaw axis of aircraft 100. To counteract the yaw moment, shaft 310 may actuate first deflector 250 and second deflector 260 to an open position, as illustrated in FIG. 3B. For example, first deflector 250 may be actuated upward from top surface 242 and second deflector 260 may be actuated downward from bottom surface 244. By actuating first deflector 250 and second deflector 260 to an open position, first deflector 250 and second deflector 260 may counteract the yaw moment exerted on aircraft 100. As first deflector 250 and second deflector 260 are opened, a yaw moment may be introduced via a drag force acting through a moment arm relative to the center of gravity of aircraft 100 such that first deflector 250 and second deflector 260 provide yaw control to aircraft 100.

FIG. 4 is a top view illustrating another example aircraft 100 in which the example yaw control device 130 may be used, according to certain embodiments. The embodiment illustrated in FIG. 4 illustrates many of the same components illustrated in FIGS. 1 through 3A and 3B, including aircraft 100, swept back wing 120, yaw control device 130 (with its position changed), first deflectors 250, and second deflectors 260. Except for changing the position of yaw control device 130 from wing tip 220 to wing-body junction 407 in FIG. 4, those components are generally as described above with respect to FIGS. 1 through 3A and 3B. FIG. 4 also illustrates an aircraft centerline 405, a wing-body junction 407, an aft shelf 410, a trailing edge control device 415, and an engine bay 420. These components and various embodiments describing the positioning of yaw control device 130 are described below.

Aircraft centerline 405 may be an axis along or through the center of aircraft 100 extending from the nose of aircraft 100 to the rear portion of aircraft 100 in an embodiment. Aircraft 100 may generally be symmetrical on each side of aircraft centerline 405 in an embodiment. For example, the shape of aircraft 100 may be symmetrical on either side of aircraft centerline 405, though there may be differences between the components positioned on or within aircraft 100. In an embodiment in which aircraft 100 has multiple yaw control devices 130, each yaw control device 130 may be positioned symmetrically about aircraft centerline 405.

Wing-body junction 407 may be a junction, area, or axis where swept back wing 120 meets, attaches, or is coupled to body 110 of aircraft 100 in an embodiment. For example, wing-body junction 407 may be located at root 210 of swept back wing 120. Wing-body junction 407 may have a structural depth that is greater than a structural depth of any portion of swept back wing 120. Wing-body junction 407 may be offset from aircraft centerline 405 and outboard of engine bay 420 in an embodiment.

Aft shelf 410 may be a portion of body 110 of aircraft 100 in an embodiment. Aft shelf 410 may be an extension of body 110 in an embodiment. Aft shelf 410 may be a portion of body 110, but may not be a portion of swept back wing 120 in an embodiment. Aft shelf 410 may be a sponson in an embodiment. Aft shelf 410 may be a flat or substantially flat portion of body 110 in an embodiment. Aft shelf 410 may be a broad, flat portion of body 110 in an embodiment. Aft shelf 410 may be positioned inboard of swept back wing 120 in an embodiment. Aft shelf 410 may be positioned towards the rear portion of aircraft 100. Aft shelf 410 may be positioned proximate to wing-body junction 407 in an embodiment. Aft shelf 410 may have a depth that is sized such that yaw control device 130 may fit within aft shelf 410. Aft shelf 410 may have a depth that is thinner than the thickest diameter of body 110, but thicker than the thickest portion of swept back wing 120 in an embodiment.

Trailing edge control device 415 may be an aircraft control device positioned at trailing edge 240 of swept back wing 120. For example, trailing edge control device 415 may be a flap, trim tab, servo tab, anti-servo tab, or any other type of control device positioned at trailing edge 240. Trailing edge control device 415 may be positioned at a distance from yaw control device 130 and outboard of yaw control device 130 in an embodiment.

Engine bay 420 may be a compartment of aircraft 100 where an engine(s) is located in an embodiment. Engine bay 420 may be positioned within body 110 of aircraft 100 in an embodiment. Engine bay 420 may be positioned inboard of wing root 210 in an embodiment. Engine bay 420 may be positioned along or centered on aircraft centerline 405 in an embodiment. Engine bay 420 may be positioned inboard of yaw control device 130 in an embodiment. In another embodiment, engine bay 420 may be positioned outboard of yaw control device 130.

In an embodiment, yaw control device 130 may be positioned on body 110 proximate or adjacent to wing-body junction 407 (e.g., proximate to a junction where body 110 and swept back wing 120 meet). Positioning yaw control device 130 on body 110 proximate or adjacent to wing-body junction 407 may provide an advantage of allowing aircraft 100 to store more fuel in swept back wing 120, thereby allowing aircraft 100 to fly longer. Positioning yaw control device 130 on body 110 proximate or adjacent to wing-body junction 407 may also reduce the weight of aircraft 100, because no additional structural weight may be needed to support yaw control device 130. Yaw control device 130 may be positioned inboard of wing-body junction 407 in an embodiment. Yaw control device 130 may be positioned on body 110 proximate to wing-body junction 407, but not on swept back wing 120 in an embodiment. Yaw control device 130 may be positioned on aft shelf 410 in an embodiment. Yaw control device 130 may be positioned on body 110 inboard or outboard of engine bay 420 in an embodiment. For example, yaw control device 130 may be positioned on body 110 inboard of engine bay 420 and proximate to wing-body junction 407. As another example, yaw control device 130 may be positioned on body 110 outboard of engine bay 420 and proximate to wing-body junction 407. Yaw control device 130 may be positioned offset or at a distance from aircraft centerline 405 in an embodiment. In that embodiment, yaw control device 130 may be positioned closer to aircraft centerline 405 than wing tip 220. Yaw control device 130 may be positioned at a distance away from and inboard of trailing edge control device 415 in an embodiment. Positioning yaw control device 130 inboard of trailing edge control device 415 may provide an advantage of reducing adverse aerodynamic interaction between yaw control device 130 and trailing edge control device 415. Yaw control device 130 may be positioned on body 110 proximate or adjacent to wing root 210 in an embodiment. As with the embodiments described in FIGS. 1 through 3A and 3B, first deflector 250 of yaw control device 130 may be positioned away from leading edge 230 such that leading edge 230 may be a continuous edge when first deflector 250 is in an open position. Similarly, second deflector 260 may be positioned away from trailing edge 240 such that trailing edge 240 may be a continuous edge when second deflector 260 is in an open position.

Figure 5A:
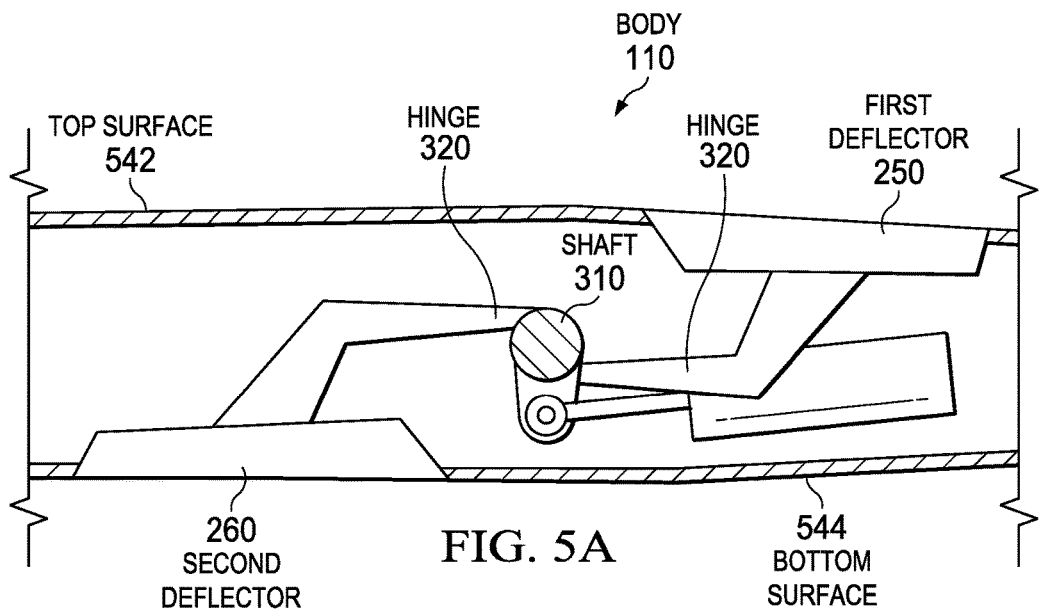
FIG. 5A is a section view illustrating an example of the aircraft with the yaw control device of FIG. 4 in a closed position, according to certain embodiments.
Figure 5B:
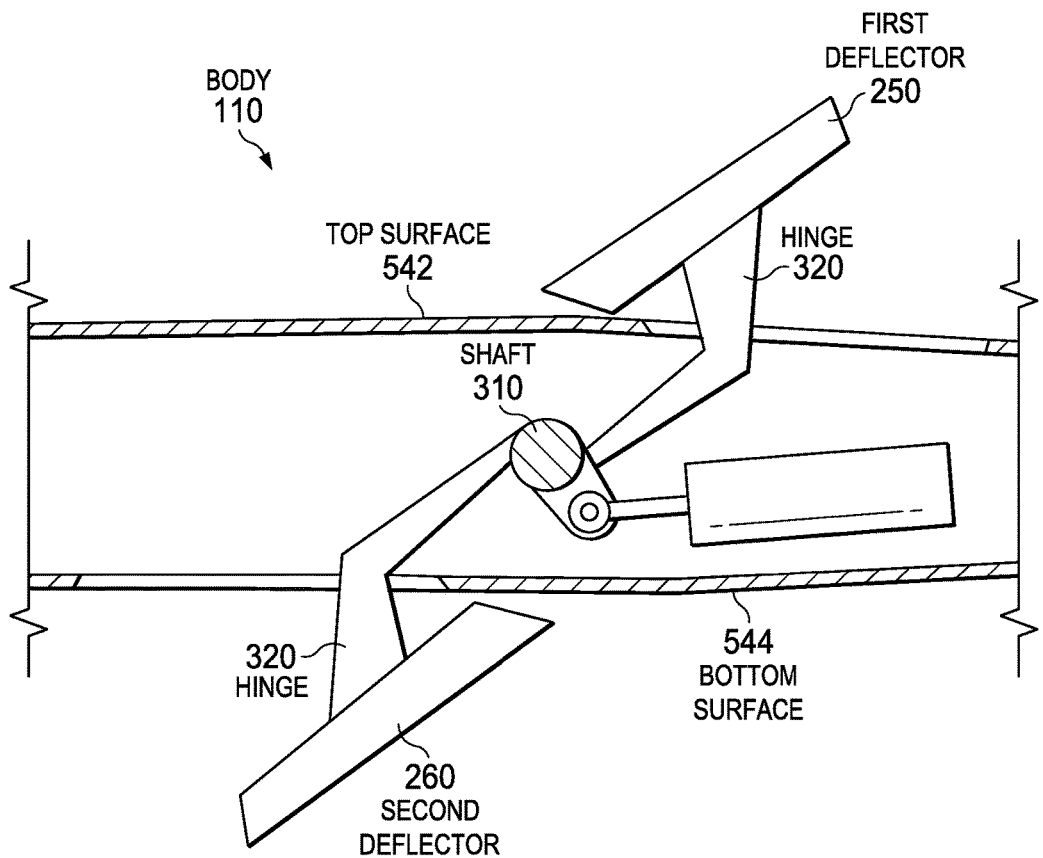
FIG. 5B is a section view illustrating an example of the aircraft with the yaw control device of FIG. 4 in an open position, according to certain embodiments.

FIG. 5A is a section view along section A-A illustrating an example of aircraft 100 with yaw control device 130 of FIG. 4 in a closed position, according to certain embodiments. FIG. 5B is a section view along section A-A illustrating an example of aircraft 100 with yaw control device 130 of FIG. 4 in an open position, according to certain embodiments. FIGS. 5A and 5B will be discussed together below. Generally, in operation, yaw control device 130 may be actuated from a closed position, as illustrated in FIG. 5A, to an open position, as illustrated in FIG. 5B, to provide yaw control to aircraft 100. As shown in the section view taken along section A-A of FIG. 4, body 110 may include a shaft 310, a hinge 320, a top surface 542, and a bottom surface 544 in an embodiment. Shaft 310 and hinge 320 are described above with reference to FIGS. 3A and 3B.

Top surface 542 may be a surface of body 110 that is the top-most surface of body 110 in an embodiment. Top surface 542 may also be a surface from which first deflector 250 extends when actuated to an open position. Top surface 542 may be opposed to bottom surface 544 in an embodiment.

Bottom surface 544 may be a surface of body 110 that is the bottom-most surface of body 110 in an embodiment. Bottom surface 544 may also be a surface from which second deflector 260 extends when actuated to an open position in an embodiment. Bottom surface 544 may be opposed to top surface 542 in an embodiment.

As an example embodiment of operation, one embodiment may include aircraft 100 with body 110. Body 110 may include yaw control device 130 with first deflector 250 and second deflector 260 each coupled to shaft 310 and positioned proximate to wing-body junction 407. First deflector 250 and second deflector 260 may initially be in a closed position, as illustrated in FIG. 5A. As aerodynamic forces act upon a side of aircraft 100, the forces may cause a moment about the yaw axis of aircraft 100. To counteract the yaw moment, shaft 310 may actuate first deflector 250 and second deflector 260 to an open position, as illustrated in FIG. 5B. For example, first deflector 250 may be actuated upward from top surface 542 and second deflector 260 may be actuated downward from bottom surface 544. By actuating first deflector 250 and second deflector 260 to an open position, first deflector 250 and second deflector 260 may counteract the yaw moment exerted on aircraft 100. As first deflector 250 and second deflector 260 are opened, a yaw moment may be introduced via both drag and lateral forces acting through a moment arm relative to the center of gravity of aircraft 100 such that first deflector 250 and second deflector 260 provide yaw control to aircraft 100.

The present disclosure may provide numerous advantages. For example, yaw control device 130 may be positioned proximate to tip 220 such that thicker regions of swept back wing 120 may be used for fuel storage thereby maximizing the range of aircraft 100. As another example, positioning yaw control device 130 proximate to tip 220 so that yaw control device 130 is not in front of a trailing edge control device (e.g., an elevon) in swept back wing 120 may provide a primary load path that may not have to transfer loads through multiple adjacent cutouts in the wing structure. As another example, a smaller actuator load may be used to actuate the deflectors of yaw control device 130 because the deflectors may be coupled to a common shaft 310. By coupling first deflector 250 and second deflector 260 to a common shaft 310, the aerodynamic moment about shaft 310 may be minimized due to opposing forces from the deflectors. Additionally, separate actuators may not be required since one actuator may be used to actuate the common shaft 310. As another example, yaw control device 130 may be positioned at a distance from the leading and trailing edges of swept back wing 120 so that leading edge 230 and trailing edge 240 are maintained as continuous edges with no breaks in the edges even when yaw control device 130 is in an open position, thereby enhancing the aerodynamic performance of aircraft 100. As another example, yaw control device 130 may be positioned at distance 290 from tip 220 such that tip 220 of swept back wing 120 may not open and close with the deflectors. This positioning may allow for a continuous leading edge 230 and trailing edge 240 at tip 220 of swept back wing 120, which may allow for a stiffer wing structure. As another example, the common shaft 310 may be oriented at an aft-swept angle, thereby providing a side force adding to the generation of a yaw moment. Deflectors having an aft-swept common shaft 310 may generate a greater yaw moment for a given surface size than a common shaft oriented normal to a longitudinal axis of aircraft 100. As another example, first deflector 250 and second deflector 260 of yaw control device 130 may each have an approximately equal area, thereby providing counter-acting hinge moments about the common shaft 310 attached to first deflector 250 and second deflector 260. The counter-acting hinge moments may minimize the total hinge moment that the common control actuator must overcome, thereby allowing for a smaller actuator. As another example, first deflector 250 and second deflector 260 may be opened on both left and right swept back wings 120 simultaneously, thereby providing a speed-brake function. As another example, positioning the deflectors proximate to a junction where the wing and fuselage meet may allow an aircraft to use more area in the wing for fuel storage, thereby allowing the aircraft to travel longer distances. As another example, positioning the deflectors in the body (e.g., fuselage) of an aircraft proximate to a junction where the wing and the body meet may reduce the structural weight of the aircraft, because the deflectors may be positioned in an area that already has sufficient structural stiffness due to the area's depth. In that example, the aircraft may not need additional structural components that add weight, thereby potentially reducing the aircraft's structural weight. As another example, positioning the deflectors away from the trailing edge control devices may reduce adverse aerodynamic effects that can result from integration of the deflectors with trailing edge control devices.

Other technical advantages will be readily apparent to one skilled in the art from the following figures, descriptions, and claims. Moreover, while specific advantages have been enumerated above, various embodiments may include all, some, or none of the enumerated advantages.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A tailless aircraft, comprising:
   a body;
   a swept back wing positioned adjacent to the body, the wing comprising:
      a bottom surface;
      a root proximate to the body; and
      a tip opposed to the root;
   a shaft positioned in the tailless aircraft at a swept back angle; and
   a yaw control device coupled to the shaft and positioned proximate to a junction where the body and the wing meet, the yaw control device comprising:
      a first deflector forming a portion of a top surface of the tailless aircraft when configured in a closed position, all of the first deflector positioned on the body proximate to the junction when in a closed position; and
      a second deflector forming a portion of the bottom surface of the tailless aircraft when configured in a closed position, all of the second deflector positioned on the body proximate to the junction when in a closed position; and
      a hinge connected to the first deflector, the second deflector, and the shaft, the hinge coupling the first deflector to the shaft and the second deflector to the shaft;
   wherein the first deflector and the second deflector are configured to simultaneously pivot from the closed position to an open position upon actuation of the shaft such that the hinge causes the first deflector to pivot about an axis of rotation through a center of the shaft upwards from the top surface and the hinge causes the second deflector to pivot about an axis of rotation through a center of the shaft and downwards from the bottom surface.

2. An aircraft, comprising:
   a body;
   a wing positioned adjacent to the body, the wing comprising:
      a bottom surface;
      a root proximate to the body; and
      a tip opposed to the root; and
   a yaw control device positioned proximate to a junction where the body and the wing meet, the yaw control device comprising:

a first deflector configured to couple to the shaft, forming a portion of a top surface of the aircraft when configured in a closed position, all of the first deflector positioned on the body proximate to the junction when in a closed position;

a second deflector configured to couple to a shaft, forming a portion of the bottom surface of the aircraft when configured in a closed position, all of the second deflector positioned on the body proximate to the junction when in a closed position; and a hinge connected to the first deflector, the second deflector, and the shaft, the hinge coupling the first deflector to the shaft and the second deflector to the shaft;

wherein the first deflector and the second deflector are configured to simultaneously pivot about an axis of rotation through a center of the shaft from the closed positions to respective first and second open positions.

3. The aircraft of claim 2, wherein a length of the first deflector is approximately equal to a length of the second deflector.

4. The aircraft of claim 2, wherein the junction where the yaw control device is positioned has a structural depth that is greater than a structural depth of the wing.

5. The aircraft of claim 2, wherein the yaw control device is positioned offset from a centerline of the aircraft and outboard of an engine bay.

6. The aircraft of claim 2, wherein the first deflector and the second deflector are each configured to open such that the first and the second deflectors each have an angle of incidence to an airflow.

7. The aircraft of claim 2, further comprising:

a second wing on an opposite side of the aircraft, the second wing positioned, adjacent to the body; and a second yaw control device positioned proximate to a junction where the body and the second wing meet, wherein the first and second yaw control devices are positioned symmetrically about a centerline of the aircraft.

8. The aircraft of claim 2, wherein the yaw control device is positioned at a distance from a trailing edge control device, wherein the yaw control device is positioned inboard from the trailing edge control device.

9. The aircraft of claim 2, wherein the wing comprises a leading edge and a trailing edge, and the first deflector is positioned away from the leading edge such that the leading edge comprises a first continuous edge when the first deflector is in the first open position and the second deflector is positioned away from the trailing edge such that the trailing edge comprises a second continuous edge when the second deflector is in the second open position.

10. The aircraft of claim 2, wherein the aircraft comprises a tailless aircraft.

11. The aircraft of claim 2, further comprising a shaft positioned within the aircraft, the shaft configured to actuate the first deflector and the second deflector of the yaw control device.

12. The aircraft of claim 2, wherein the yaw control device is positioned on an aft shelf of the body of the aircraft.

13. The aircraft of claim 2, wherein the first deflector pivots upwards from the top surface of the body and the second deflector pivots downwards from the bottom surface of the body.

14. An apparatus, comprising:

a first deflector configured to couple to a shaft of an aircraft and form part of a top surface of a body of the aircraft when in a first closed position; and a second deflector configured to couple to the shaft and form part of a bottom surface of the body when in a second closed position;

a hinge connected to the first deflector, the second deflector, and the shaft, the hinge coupling the first deflector to the shaft and the second deflector to the shaft;

wherein:

the first deflector and the second deflector are configured to be positioned at a junction of the body of the aircraft and a wing of the aircraft, all of the first deflector positioned on the body proximate to the junction when in a closed position and all of the second deflector positioned on the body proximate to the junction when in a closed position and the first deflector and the second deflector are configured to simultaneously pivot about an axis of rotation through a center of the shaft from the closed positions to respective first and second open positions upon actuation of the shaft.

15. The apparatus of claim 14, wherein a length of the first deflector is approximately equal to a length of the second deflector.

16. The apparatus of claim 14, wherein the junction where the yaw control device is positioned has a structural depth that is greater than a structural depth of the wing.

17. The apparatus of claim 14, wherein the yaw control device is positioned onset from a centerline of the aircraft and outboard of an engine bay.

18. The apparatus of claim 14, wherein the first deflector and the second deflector are each configured to open such that the first and the second deflectors each have an angle of incidence to an airflow.

19. The apparatus of claim 14, wherein the yaw control device is positioned at a distance from a trailing edge control device, wherein the yaw control device is positioned inboard from the trailing edge control device.

20. The apparatus of claim 14, wherein the yaw control device is configured to be positioned on an aft shelf of the body of the aircraft.

* * * * *